United States Patent [19]

Spirig

[11] 4,336,122
[45] Jun. 22, 1982

[54] ELECTROLYSIS APPARATUS

[76] Inventor: Ernst Spirig, CH-8640 Rapperswil, Switzerland

[21] Appl. No.: 185,027

[22] Filed: Sep. 8, 1980

[51] Int. Cl.³ .................. C25B 15/08; C25B 9/04; C25B 13/00; C25B 11/02

[52] U.S. Cl. ........................ 204/222; 204/129; 204/228; 204/256; 204/258; 204/269; 204/270; 204/262; 204/274; 204/284

[58] Field of Search .................. 204/267–270, 204/253–258, 262, 263–266, 129, 222, 274, 228, 284

[56] References Cited

U.S. PATENT DOCUMENTS

| | | | |
|---|---|---|---|
| 1,965,813 | 7/1934 | Stuart | 204/129 |
| 2,034,458 | 3/1936 | Calcott et al. | 204/262 X |
| 2,177,626 | 10/1939 | Müller | 204/262 X |
| 2,695,874 | 11/1954 | Zdansky | 204/258 |
| 2,717,872 | 9/1955 | Zdansky | 204/258 X |
| 2,888,939 | 6/1959 | Nitsche | 204/222 X |
| 3,119,760 | 1/1964 | Foreman et al. | 204/274 X |
| 3,767,542 | 10/1973 | Carlson | 204/129 X |
| 3,771,361 | 11/1973 | Reznick | 204/222 X |
| 3,957,618 | 5/1976 | Spirig | 204/270 |
| 3,990,962 | 11/1976 | Götz | 204/278 X |
| 4,113,601 | 9/1978 | Spirig | 204/270 X |
| 4,206,029 | 6/1980 | Spirig | 204/274 X |
| 4,299,681 | 11/1981 | Mosé et al. | 204/274 X |

*Primary Examiner*—Andrew Metz
*Assistant Examiner*—Donald R. Valentine
*Attorney, Agent, or Firm*—Laubscher, Philpitt and Laubscher

[57] ABSTRACT

An electrolysis apparatus is disclosed and comprises a plurality of cells connected in series both on the current flow path (an electrical course being connected across the end ones of the electrodes) and the electrolyte/gas flow path (electrolyte entering one end cell through one end electrode and gas issuing from the other end cell through the other end electrode), the cells including at least one series of gas generating cells followed by at least one cooling cell. The end electrodes of a series of cells may be short circuited so that these cells become cooling cells because they are not active to generate gas and instead the electrolyte and gas flowing through them undergoes cooling. The apparatus may be arranged for generating detonating gas or may be modified for generating oxygen and hydrogen at separate outlets.

36 Claims, 13 Drawing Figures

ELECTROLYSIS APPARATUS

BACKGROUND OF THE INVENTION

This invention relates to electrolysis apparatus, especially for the electrolysis of water, and is applicable to apparatus for producing oxyhydrogen gas (detonating gas) and to apparatus producing oxygen and hydrogen at separate outlets. The invention in concerned with improved cooling of the apparatus and electrolyte.

My British patent application No. 7,914,972 relates to a simple construction of apparatus for generating detonating gas, comprising a plurality of parallel-disposed electrode plates clamped together with a ring-shaped spacer between each pair of electrodes: the space between each pair of electrodes, and enclosed by the spacer, defines a cell. A d.c. electrical supply is connected across the two outermost electrode plates so as to connect the plurality of cells in series. Fresh electrolyte is supplied through an inlet to one end cell and electrolyte and generated gas flow from cell-to-cell (through apertures formed through the electrode plates near the top of the cells) until the final cell, where the detonating gas leaves by way of an outlet, mixed with a certain amount of electrolyte.

In any electrolysis apparatus having a plurality of cells arranged in series both on the electrical and electrolyte flow paths, the electrolyte and gas increase in temperature from cell-to-cell through the apparatus towards the outlet. The rate of gas generation increases with the current flowing, but so also does the heat generated. The electrolyte entering any cell (after the first) is the already-heated electrolyte from the previous cell, so that with many cells arranged in series a limit temperature might well be reached, where the electrolyte entering the next cell is too high. In my British patent application No. 7,914,972, cooling is provided for in that the electrode plates project outwardly beyond the spacers and the surfaces of these projecting portions of the plates are available for cooling by ambient air or by pre-cooled air (forced cooling).

By making the electrode plates thicker to increase heat flow and increasing the surface areas in contact with the cooling air, heat dissipation can be improved. Appropriate choice of metals also assists cooling: electrodes of copper plated with nickel are effective. Less costly steel electrodes, also nickel plated, have lower heat conductivity, leading to poorer cooling: increasing the thickness of these electrodes to improve heat flow leads to increased weight and cost. Another appropriate metal is stainless steel and this does not require a nickel coating at low electrolyte temperatures: however, if higher temperatures do occur, then the stainless steel will be attacked by the hot electrolyte.

It is generally desirable, therefore, to improve the cooling and enable higher rates of gas generation. Improved rates of hydrogen or hydrogen-and-oxygen generation are of particular interest in the development for the future of hydrogen engines for cars. Hydrogen may be stored, at ambient temperature and avoiding very high pressures, in iron-titanium pellet tanks: the hydrogen is absorbed by crystals of iron-titanium within a tank and the hydrogen is not released accidentally even if the tank is punctured. Experimental cars being developed on this principle lack a low-cost, high-rate hydrogen generator able to produce sufficient hydrogen over night to re-charge a spent tank. Such generators might even be installed in the household. Experimental cars to date demonstrate a range of about 200 kilometers before a full hydrogen tank requires recharging, if the car is driven under reasonable conditions. The capacity of the tank corresponds with 32000 liters of hydrogen at ambient temperatures. In accordance with Faraday's law, a current of 26.8 amps flowing for one hour will produce 11.2 liters of hydrogen and 5.6 liters of oxygen. As an example of a household generator, working from a 380 volts a.c. supply, a rectified supply of 380 volts d.c. may be produced without using a transformer; this could feed an apparatus having 190 cells in series (each with the usual voltage drop of about 2 volts). With a current of 100 amps flowing, the equivalent is 19,000 amps flowing through a single cell, generating $19,000 \div 26.8 \div 11.4 = 8082$ liters of hydrogen in one hour. Thus the tank of 32,000 liters would be re-charged within 4 hours: or, for example, a current of 50 amps would re-charge the tank in 8 hours.

Because the tank accepts only hydrogen, the generator must either produce hydrogen separated from oxygen, or the oxygen must be eliminated from the detonating gas eliminated for example by using it up in an appropriate chemical reaction, or by employing a molecular sieve or other means for separating gases.

A detonating gas generator, such as the apparatus disclosed in my British patent application No. 7,914,972, does generally operate with lower heat losses than does an apparatus producing oxygen and hydrogen separately, because the path of the electrical current through the electrolyte can be kept very short. Also, the cell construction is much simpler because there is no need for a diaphragm to divide the cell into oxygen and hydrogen sections. Nevertheless, this invention is applicable both to a detonating gas generator and to an apparatus for generating oxygen and hydrogen separately.

SUMMARY OF THE INVENTION

In accordance with this invention, there is provided an electrolysis apparatus, comprising a plurality of cells connected in series both on the current flow path and the electrolyte/gas flow path, the cells including at least one series of gas generating cells followed by at least one cooling cell.

The heat extracted from the apparatus may simply be fed back and used for the heating system of the house, where it is a household apparatus, thus rendering the proposition of the hydrogen car engine more attractive: heat energy otherwise wasted and lost is thus utilized.

BRIEF DESCRIPTION OF THE FIGURES

Embodiments of this invention will now be described, by way of examples only, in which.

DETAILED DESCRIPTION

Figure 1:
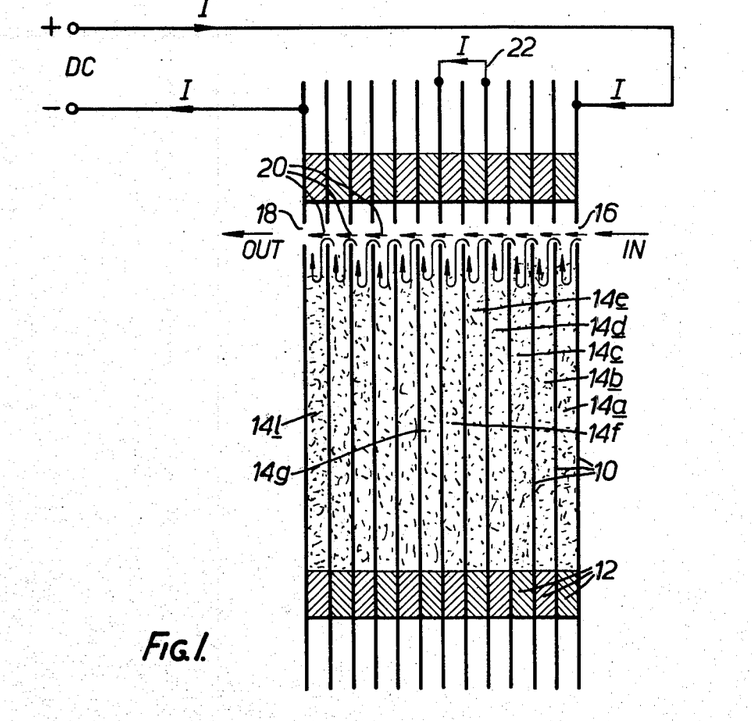
FIG. 1 is a vertical longitudinal section through an embodiment of detonating gas generator.

FIG. 1 shows an electrolysis apparatus in the form of a detonating gas generator basically as disclosed in my British patent application No. 7,914,972. The generator comprises a plurality of parallel disposed electrode plates 10 clamped together (by means not shown) with a ring-shaped spacer 12 between each pair of electrodes. The space between each pair of electrodes, and enclosed by the spacer 12, defines a cell and these are referenced 14a, 14b, 14c... The spacers may be circular or any other convenient shape and the electrode plates project beyond the spacers to provide cooling surfaces in contact with ambient air. A d.c. electrical source is connected across the two outermost electrode plates as shown to connect the cells electrically in series. An inlet 16 for fresh electrolyte is provided into the first cell 14a and electrolyte and generated gas flow from cell-to-cell through apertures 20 formed in the electrode plates (near the top of the cell), eventually arriving at the final cell 14l and then passing through an outlet 18 from the final cell, inlet 16 and outlet 18 comprising apertures in the respective outermost electrode plates.

In accordance with this invention, after a first series of gas generating cells 14a–14d, two cells 14e and 14f are arranged as cooling cells, and thereafter a series of gas generating cells 14g–14l follows. The cooling cells are effective to cool by provision of an electrical short circuit placed across them: in the example shown this short is represented by an electrical connection 22 between the outermost electrode plates of the series of cooling cells. Thus no voltage drop occurs across the cells and no gas generation takes place: instead, in passing through these cells, the gas and electrolyte cool. This is represented in the schematic graph of FIG. 1A by line b, while line a represents the progressively increasing temperature (from inlet temperature T in to outlet temperature T out) which would occur if all cells were active in generating gas. Instead of two cooling cells, a single cooling cell or a greater number of cooling cells may be provided. Also, a number of cooling cells may be spaced through the entire series of cells, the cooling cells and gas generating cells alternating, with the number of cells in each set chosen as desired. For providing the electrical connection 22, the spacers for the cooling cells might be electrically conductive (the spacers for the gas generating cells being necessarily electrically insulating).

Figure 1A:
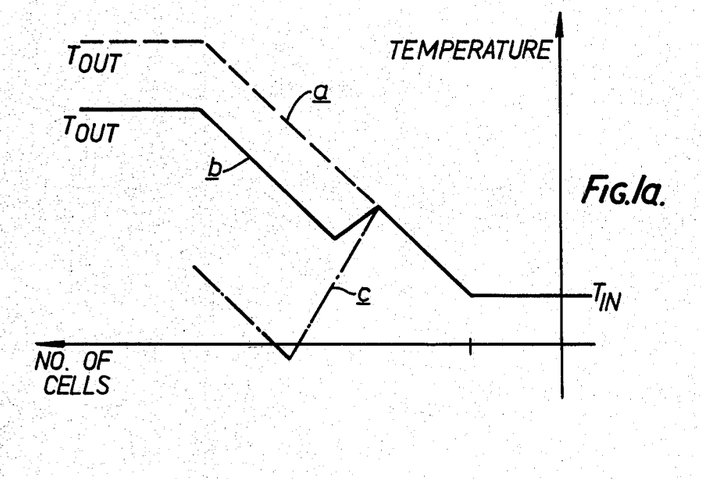
FIG. 1A is a graph schematically illustrating the variation of temperature through a prior art apparatus, the apparatus of FIG. 1 and the apparatus of FIG. 2.
Figure 2:
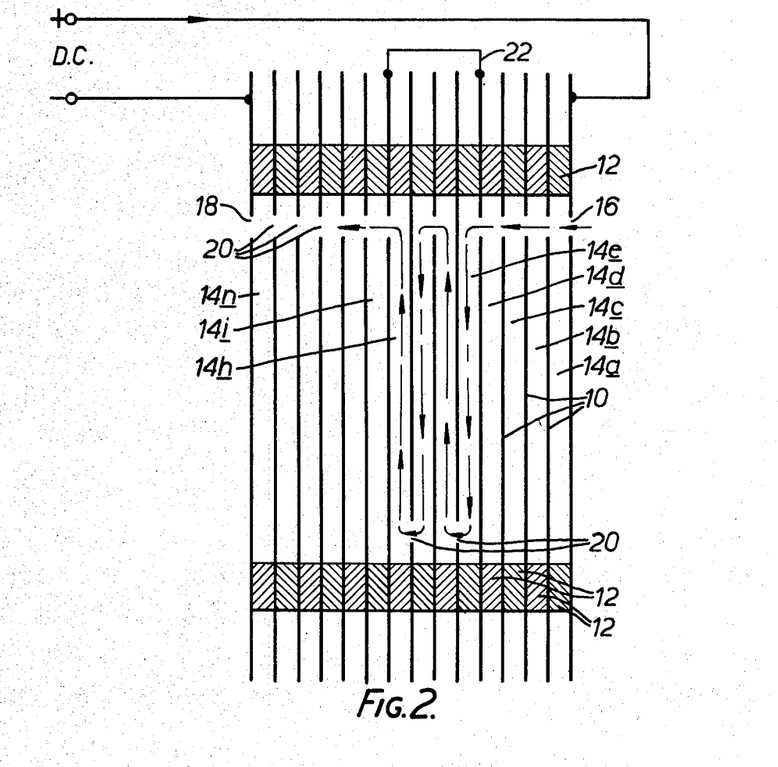
FIG. 2 is a section similar to FIG. 1 through a modified detonating gas generator.

FIG. 2 shows a modification in which, in the cooling cells 14e–14h, the apertures 20 in the electrode plates are alternately near the top and near the bottom of the cells, so that the electrolyte and gas follow a lengthy path alternately downwards and then upwards in adjacent cells, as shown by the arrows, therefore increasing the heat flow into the metal electrode plates. This result may be achieved by using identical electrode plates, with alternate ones turned through 180° in the cooling cells. Line c in FIG. 1b shows the improved rate of cooling which is obtained by this arrangement.

Figure 3A:
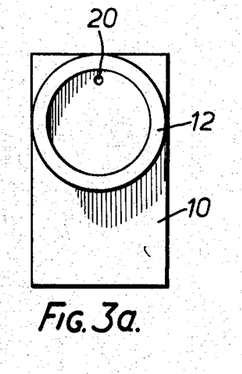
FIGS. 3a and 3b show arrangements of the electrode plates and spacers for facilitating assembly and FIG. 3c shows a channel on which they may be assembled.
Figure 3B:
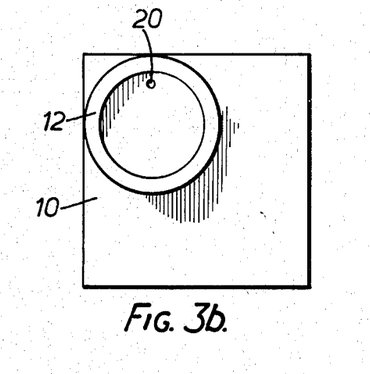
Figures 3C, 3D, 4:
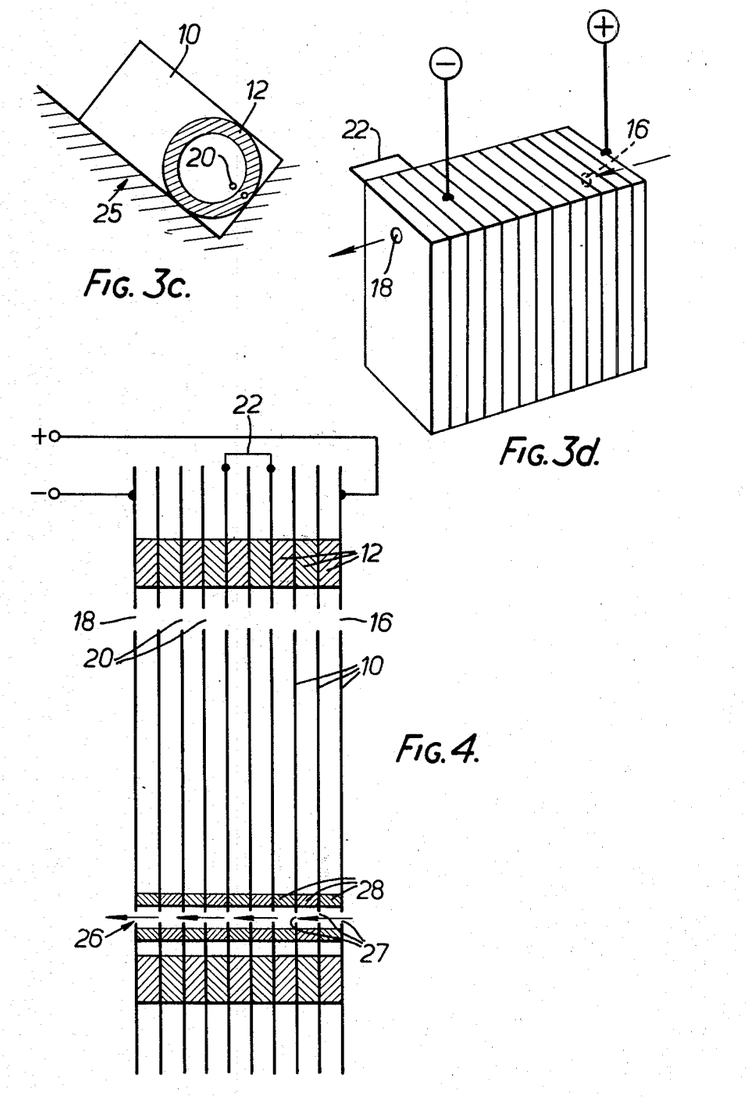
FIG. 3d is a perspective view of another modified detonating gas generator.
FIG. 4 is a section through a further modified detonating gas generator with supplementary cooling.

With a large number of electrode plates and spacers to be clamped together, it is important to ensure a precise alignment otherwise the stack may become unstable under the clamping pressure. FIGS. 3a and 3b show arrangements of electrode plates 10 and spacers 12 for facilitating precise alignment in assembly, applicable to all apparatus in accordance with this invention and to apparatus in accordance with invention of my British patent application No. 7,914,972. Thus, in FIG. 3a, the electrode plate has 3 sides tangential to the outer circumference of the circular spacer, and in FIG. 3b the electrode plate has two adjacent sides tangential to the outer circumference of the spacer. FIG. 3c shows a convenient assembly technique, in which an inverted V shaped channel is provided for receiving the electrode plates and spacers during assembly: precise alignment is ensured by the action of gravity placing each component into contact with the two sides of the V.

Preferably as shown in FIGS. 3a and 3b, the spacers are disposed at this top edge of the electrode plates so that the cooling surfaces project to the bottom cells.

FIG. 3d shows a further modified apparatus in which a set of cooling cells is arranged at the outlet end of the overall series of cells, so that the gas and electrolyte leaving the apparatus is cooled preferably to ambient temperature.

FIG. 4 shows a supplementary cooling arrangement applicable to all apparatus of this invention and to the apparatus of my British patent application No. 7,914,972. Thus, a cooling fluid is passed through at least one cooling duct 26 provided through the apparatus, either within the spacers as shown or outside them. The duct 26 is formed by aligned apertures 27 in the electrode plates and further electrically insulating spacers 28. Preferably the duct 26 is at the lower part of the apparatus and the cooling fluid must be electrically insulating, e.g. a heat exchanger oil or a heat energy pump fluid. If the apparatus is running at a low temperature, the fluid may be fed to a heat pump and the output temperature would be say 70° C. and appropriate for feeding directly into the household heating system.

Figure 5:
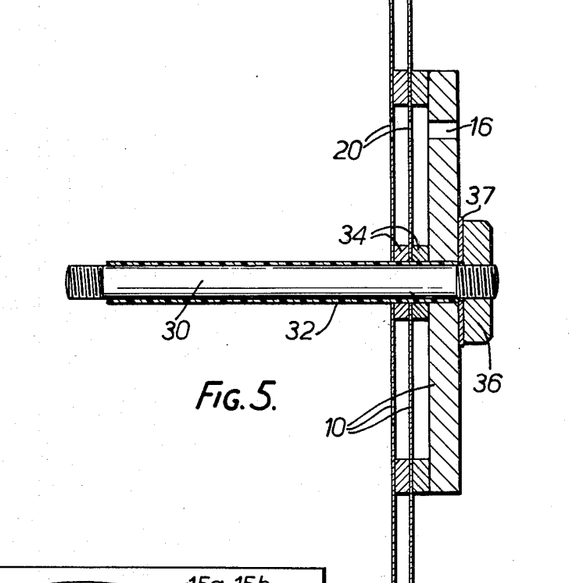
FIG. 5 is a section through a further modified apparatus showing a preferred clamping means.

FIG. 5 shows a clamping arrangement applicable to all apparatus in accordance with this invention and also to the apparatus of my British patent application No. 7,914,972. Thus, a bolt 30 extends centrally through the stack and the peripheral bolts of my application No. 7,914,972 are dispensed with. This minimizes the metal work on the electrodes, provides heat flow from the outer cells and provides for a stable stack of cells and spacers. Each electrode plate is formed with only the single central aperture for the bolt, in addition to the aperture or apertures 20. Preferably as shown the outermost electrode plates are thicker than the others and need be only the same size and shape as the outer circumference of the main spacer rings 12. The bolt is provided with an electrically insulating sleeve 32 (e.g. a heat shrunk tube or a rigid plastics tube) and an additional spacer 34 is provided in each cell around the bolt to seal that cell. At each end of the bolt a nut 36 is applied with an electrically insulating washer 37 interposed between the nut and the underlying end plate.

Figure 6:
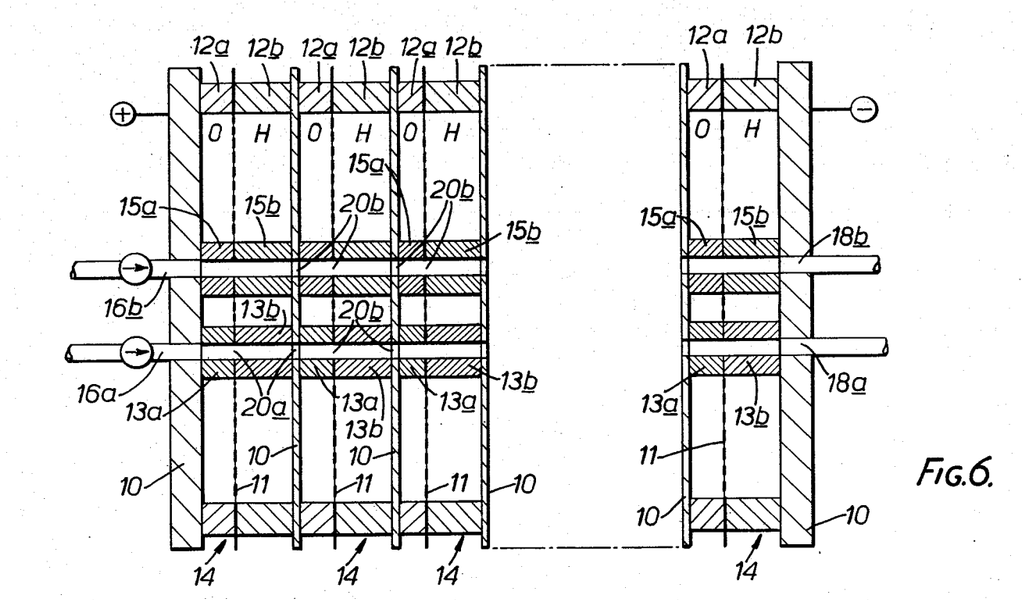
FIG. 6 is a longitudinal section, on the line VI—VI of FIG. 7, through an embodiment of apparatus for generating oxygen and hydrogen at separate outlets.
Figures 7, 7A:
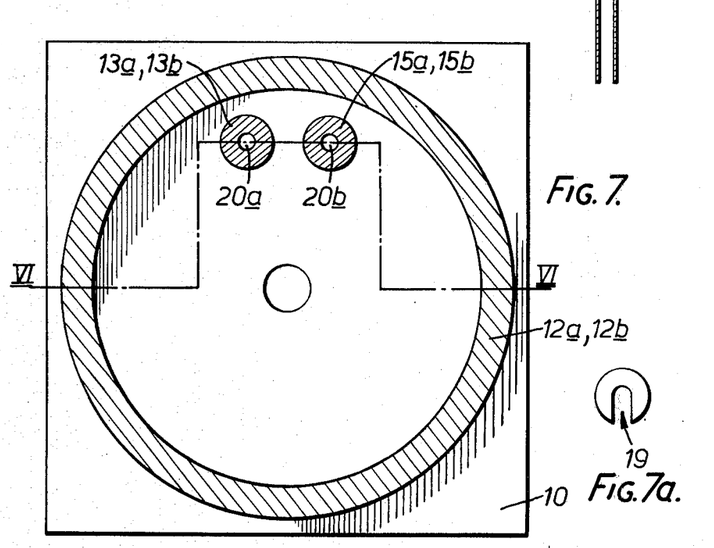
FIG. 7 is a cross-section through a gas generating cell of the apparatus of FIG. 6.
FIG. 7A is a cross-section through a special spacer of the apparatus.
Figure 8:
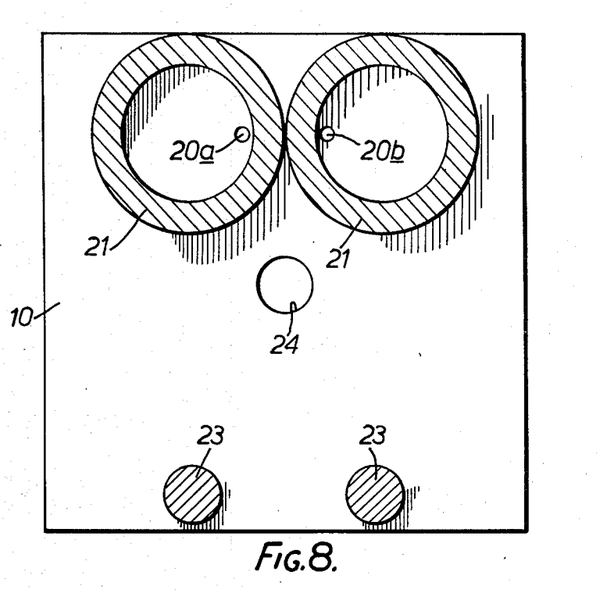
FIG. 8 is a cross-section through a cooling cell of the apparatus of FIGS. 6 and 7.

FIGS. 6, 7 and 8 show an apparatus for providing hydrogen and oxygen at separate outlets. The apparatus comprises a plurality of parallel metal electrode plates 10 defining gas generating cells 14 (and also some cooling cells as will be described in relation to FIG. 8). Between each pair of adjacent plates in the gas generating cells, a diaphragm 11 is provided and is spaced from the respective plates by spacers 12a,12b. Thus, each gas generating cell 14, formed between a respective pair of adjacent plates, is divided into oxygen and hydrogen-generating sections by the diaphragm 11. The outermost or end electrode plates are thicker and are connected respectively to the positive and negative poles of the d.c. electricity source. FIG. 7 shows square electrode plates and circular spacers, but other shapes may be envisaged.

The outermost electrode plate for connection to the positive pole is provided with inlets 16a, 16b for electrolyte, and the opposite outermost electrode plate is provided with outlets 18a,18b respectively supplying hydrogen and oxygen. The intermediate electrode plates and diaphragms are each provided with a pair of apertures 20a,20b at the same horizontal level near the top of the cells. The inlet 16a and outlet 18a are aligned with the apertures 20a, while the inlet 16b and outlet 18b are aligned with the apertures 20b. Moreover, a first series of tubular spacers 13a,13b is provided in alignment with apertures 20a and a second series of tubular spacers 15a,15b is provided in alignment with apertures 20b.

The arrangement is such that, in each gas generating cell, the diaphragm 11 is supported on opposite sides, around its aperture 20a, by spacers 13a,13b spacing it from its respective electrode plates in the oxygen and hydrogen sections. Likewise, the diaphragm 11 is supported on its opposite sides, around its aperture 20b, by spacers 15a,15b spacing it from its respective electrode plates in the oxygen and hydrogen sections. The tubular spacers 13b and 15a are each formed with a longitudinal slot 19 as shown in FIG. 7a. Accordingly, inlet 16a and hydrogen outlet 18a communicate only with the hydrogen sections of the cells, the communication being effected through the tubular spacers 13a,13b and the slots 19 in spacers 13b. Similarly, inlet 16b and oxygen outlet 18b communicate only with the oxygen sections of the cells, the communication being through the tubular spacers 15a,15b and the slots 19 in the spacers 15a.

Cooling cells may be provided, as previously described for the apparatus of FIG. 1. The construction of such a cooling cell is illustrated in FIG. 8, and differs from a gas generating cell in that the diaphragm 11 and the spacers 12a,12b are dispensed with: instead, two spacers 21 (for example circular) are provided between the two electrode plates of the cell, respectively, encircling the apertures 20a,20b and defining hydrogen and oxygen cooling cell sections, and further spacers 23 are provided near the bottom to retain the stability of the structure. The outermost electrode plates of the cooling cell or cells are electrically short circuited so that the cells are inactive and instead effect cooling.

The stack of electrode plates and spacers are clamped together, for example by a central bolt (as shown in FIG. 5) inserted through apertures 24 in the plates (FIG. 8).

In operation of the apparatus of FIGS. 6 to 8, electrolyte is fed through inlets 16a and 16b into the hydrogen and oxygen sections of the first cell, and from this first cell it proceeds to the respective hydrogen and oxygen sections of the other cells in succession. Oxygen is generated at the positive plate of each cell and hydrogen is generated at the negative plate of each cell: the oxygen and hydrogen flow through the cells in succession in the respective oxygen and hydrogen outlets 18b,18a. The diaphragms 11 prevent the flow of gas from one gas section to the other within the individual cells, but permit electrical current flow. Preferably, the hydrogen section of each cell is twice the volume of the oxygen section (for example by a difference in width of the sections, as shown), to take account of the fact that twice as much hydrogen as oxygen is generated, and tending to equalize the pressures on the opposite sides of the diaphragm, likewise the hydrogen apertures are twice the oxygen apertures.

The electrolyte is preferably fed to the inlets 16a, 16b through one-way valves to prevent the back-flow of oxygen and hydrogen. Preferably a differential pressure sensor is coupled to the outlets 18a, 18b, controlling electrical valves causing the venting of one gas volume should the other gas volume drop in pressure (for example owing to consumption by the user), again in order to reduce the difference in the pressures on opposite sides of each diaphragm.

The apparatus of FIGS. 6 to 8 differs from prior art apparatus, also arranged to produce oxygen and hydrogen at separate outlets, by the feature (among others) that it is not necessary to provide two connections to the exterior for each cell section (one for electrolyte and one for the generated gas).

In another development to increase efficiency in both cooling and extracting heat for use in space-heating in the home, comprises placing the stack of cells in a vessel filled with a heat exchanging fluid. This fluid is circulated from the vessel, through a heat exchanger and back to the vessel, the heat exchanger output being included in the heating system. This development is preferable especially for an apparatus with a large number of cells. The advantage relative to the arrangement of FIG. 4 would be that the cooling circuit 26-27-28 within the cells would be dispensed with, thus maximizing the effective cell area and dispensing with the requirement for the additional spacers 28.

A further development to increase cell efficiency comprises introducing ultrasonic or sonic vibrations into the cells, in order to remove more quickly the gas bubbles from the electrode plates. Gas bubbles generated at the electrode plate surfaces have a negative effect on the electrical current flow, effectively providing a series resistance causing increased heat losses. Also the resistance to heat flow for cooling is increased. Ultrasonic or sonic vibrations introduced into the cells will remove the bubbles much quicker, to reduce these drawbacks, and also aiding quicker separation of the electrolyte. The vibrations may be introduced by electro-mechanical transducers (e.g. piezoceramic or magnetostrictive devices) mounted on the outside of the end electrode plates, or mounted on the inside and/or outside of a vessel filled with fluid in which the stack of cells is immersed. This vessel may be the cooling fluid vessel described in the last preceding paragraph above.

In the case of the detonating gas generators preferably the electrolyte is supplied to the inlet 16 through a one-way valve effective to prevent the back-flow of detonating gas.

In a modification applicable to all embodiments described above, it is proposed to arrange the cells in a number of separate groups connected by tubing to carry gas flow. For example, a stack of active cells may be connected to a stack of cooling cells by tubing, the outlet of the cooling cell stack being connected by further tubing to another stack of active cells, and so on.

This is advantageous where it is necessary to limit the overall length of the apparatus, the several stacks of cells being then arranged side-by-side for example.

Figure 9:
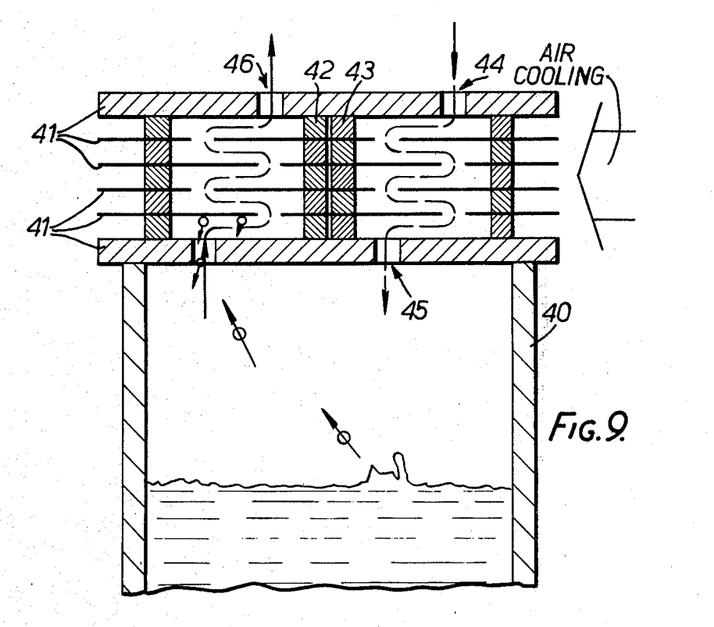
FIG. 9 is a vertical section through outlet cooling cells provided on an electrolyte tank.

FIG. 9 shows a tank through which the generated gas may be fed after leaving the final cell, in any of the arrangements described above. The tank 40 is closed at its top by the lowest of a stack of flat plates 41, horizontally disposed. Each adjacent pair of plates is separated by two circular spaces 42,43, thus defining two series of cooling cells. The uppermost plate 41 is provided with an inlet aperture 44 and the plates 41 within the spacers 43 are provided with staggered apertures for constraining the incoming gas and electrolyte mixture to undergo a tortuous path before passing through an aperture 45 in the lowermost plate 41 and into the tank 40. The electrolyte splashes onto a body of electrolyte at the bottom of the tank, and the gas (still possibly with some electrolyte and water vapour) passes through a simmilar arrangement of cooling cells defined by spacers 42, to finally issue from an outlet 46 in the uppermost plate 41. Water vapor or electrolyte separating from the gas in this final series of cooling cells returns to the tank and the body of electrolyte therein. An inlet for fresh electrolyte may be provided through the stack of plates 41, alongside the spacers 42,43, and an outlet for electrolyte may be provided adjacent the bottom of the tank for supply to the gas generating cells.

The stack of plates 41 and spacers 42,43 may be clamped together by two bolts extending from the top plate 41, through the respective series of cooling cells, down through the interior of the tank and to or out through its bottom wall, further spacers being disposed between each pair of adjacent plates with the bolts extending through the respective ones of these further spacers.

A forced flow of air may be provided across the cooling cells on the top of the tank. These cooling cells ensure a minimum temperature for the issuing gas, thus minimising the water vapor pressure, and also trap the corrosive electrolyte drops. The gas outlet path should have a sufficiently large diameter for low gas speed to avoid carrying water or electrolyte drops further. In the separate hydrogen and oxygen apparatus, respective tanks are provided with the hydrogen tank twice the volume of the oxygen tank and the electrolyte of the two tanks intercommunicating adjacent their bottoms.

I claim:

1. An electrolysis apparatus, comprising a plurality of parallel disposed electrode plates with a closed-loop spacer disposed between each pair of adjacent plates, the plates and spacers being clamped together by a bolt extending through the plates and each intervening cell within the area defined by the respective spacer.

2. Apparatus as defined in claim 1, and further comprising spacer means disposed between said pair of adjacent electrode plates and containing an aperture through which said bolt extends.

3. An electrolysis apparatus for electrolysing water to produce oxygen and hydrogen at separate outlets, comprising a plurality of spaced electrode plates defining a cell between each pair of adjacent plates, a gas-impervious diaphragm disposed between each pair of adjacent plates and dividing that cell into oxygen- and hydrogen-generating portions, a first duct extending through the cells and connecting the oxygen-generating portions of the cells together and, at opposite ends, to an electrolyte inlet and an oxygen outlet of the apparatus and a second duct extending through the cells and connecting the hydrogen-generating portions of the cells together and, at opposite ends, to an electrolyte inlet and a hydrogen outlet of the apparatus.

4. An apparatus as claimed in claim 3, in which each gas generating cell comprises a first closed-loop spacer disposed between one electrode plate and the diaphragm and a second closed-loop spacer disposed between the other electrode plate of the cell and the diaphragm, and means clamping the electrode plates, diaphragm and spacers together, the hydrogen and oxygen ducts passing through the cells, and communicating with the respective cell portions, adjacent the tops of the cells.

5. An apparatus as claimed in claim 4, in which each of the hydrogen and oxygen ducts comprises aligned apertures through the electrode plates and diaphragms of the successive gas generating cells, with a spacer in each of the oxygen- and hydrogen-generating portions disposed between the diaphragm and the respective electrode plate and formed with an aperture for the flow of the respective gas, the spacers affording communication between the oxygen and hydrogen ducts and the respective portions of the gas generating cells.

6. An apparatus as claimed in claim 3, further comprising a differential pressure sensor coupled to the two gas outlets and controlling venting of one gas volume should it exceed a threshold pressure in excess of the other gas volume.

7. An electrolysis apparatus, comprising
(a) a plurality of serially arranged electrolytic cells having a current flow path and a gas and electrolyte flow path, said cells including at least one cooling cell arranged adjacent and downstream of a series of gas generating cells; and
(b) tubing means for spacing and interconnecting said cooling cell from said gas generating cells for flow of electrolyte and gas from said gas generating cells to said cooling cell.

8. An electrolysis apparatus, comprising
(a) a plurality of parallel spaced electrode plates defining an assembly of serially arranged cells having a current flow path and a gas and electrolyte flow path, said cells including at least one cooling cell arranged adjacent and downstream of a series of gas generating cells,
(b) each of said plates containing an aperture defining said gas and electrolyte flow path between successive ones of said cells, said apertures being arranged alternately adjacent the top and bottom of said successive cells.

9. An electrolysis apparatus, comprising
(a) a plurality of parallel spaced electrode plates;
(b) a plurality of spacer means arranged between said electrode plates, respectively,
(c) each of said plates and each of said spacer means containing an aperture;
(d) bolt means arranged within said apertures for clamping said electrode plates and said spacer means together, whereby said plates and the chambers within said spacer means cooperate to define a series of electrolytic cell chambers, said cell chambers having a current flow path and a gas and electrolyte flow path, at least one of said cell chambers comprising a cooling cell chamber arranged downstream of a series of gas-generating cell chambers.

10. Apparatus for electrolysis of water to generate oxygen and hydrogen at separate outlets, comprising (a) a plurality of parallel spaced electrode plates (10) adapted to define a plurality of serially arranged cells;
(b) a plurality of gas-impervious diaphragms (11) arranged within said cells in spaced relation between said plates, respectively;
(c) first annular spacer means (12a) arranged within said cells, respectively, between one of said plates and said diaphragm;
(d) second annular spacer means (12b) arranged within said cells, respectively, between the other of said plates and said diaphragm;
(e) means (30) for clamping said electrode plates, said diaphragms, and said first and second spacer means together, whereby said plates, said diaphragms, and said spacer means define a series of electrolytic cell chambers having oxygen generating and hydrogen generating portions, respectively;
(f) said electrode plates and said diaphragms each containing a pair of aligned apertures (20a, 20b);
(g) said cells including further spacer means (13a, 13b, 15a, 15b), each of said spacer means containing through channels aligned with said apertures, respectively, thereby to define first and second duct means for connecting said oxygen generating portions of said cells with an oxygen outlet and for connecting said hydrogen generating portions of said cells with a hydrogen outlet.

11. An electrolysis apparatus, comprising
(a) a plurality of parallel spaced electrode plates defining an assembly of serially arranged cells having a current flow path and a gas and electrolyte flow path, said cells including at least one cooling cell arranged downstream of a series of gas generating cells; and
(b) vibrating transducer means mounted on at least one of said plates for vibrating said gas generating cells to promote the release of gas from its electrodes.

12. An electrolysis apparatus, comprising
(a) a plurality of serially arranged electrolytic cells having a current flow path and a gas and electrolyte flow path, said cells including at least one cooling cell arranged downstream of a series of gas generating cells; and
(b) an electrolyte tank including
 (1) a first series of cooling cells for receiving gas and electrolyte from said electrolytic cells and delivering said gas and electrolyte into said tank; and
 (2) a second series of cooling cells for receiving gas from said tank and delivering said gas to an outlet.

13. An electrolysis apparatus, comprising
(a) a plurality of serially arranged electrolytic cells having a current flow path and a gas and electrolyte flow path, said cells including at least one cooling cell arranged downstream of a series of gas generating cells; and
(b) an electrolyte tank including
 (1) a plurality of spaced parallel electrode plates;
 (2) a plurality of spacer means arranged between said plates, respectively
 (3) bolt means for clamping said electrode plates and said spacer means together and for clamping said electrode plates and said spacer means to the top of said tank, whereby said plates and the chambers within said spacer means cooperate to define a series of cooling cells; and
 (4) said electrode plates each containing an aperture to define a gas and electrolyte flow path between said cells.

14. An electrolysis apparatus, comprising
(a) a plurality of vertically arranged parallel spaced electrode plates (10);
(b) a plurality of annular spacer means (12) arranged between said electrode plates, respectively;
(c) means (30) for clamping said electrode plates and said spacer means together whereby said plates and the chambers within said spacer means cooperate to define a series of electrolytic cell chambers;
(d) the end plates of said plurality of electrode plates containing inlet (16) and outlet (18) openings, respectively;
(e) said electrode plates intermediate said end electrode plates each containing an aperture (20);
(f) a direct-current voltage source connected across said end electrode plates, whereby when electrolyte is successively introduced into said cells via a flow path through said inlet opening and said apertures, said cells are successively energized by said voltage source to generate gas which exits said cells via the flow path through said apertures and said outlet opening; and
(g) cooling means arranged downstream of a series of said gas generating cells, said cooling means comprising electrical short circuit means (22) for electrically connecting together at least one pair of said electrode plates, whereby the cell defined between said pair of short circuited electrode plates operates as a cooling cell rather than as a gas generating cell.

15. Apparatus as defined in claim 14, wherein said cells include at least one series of gas generating cells downstream of said cooling means.

16. Apparatus as defined in claim 15, wherein a plurality of series of cooling means alternate with a plurality of series of gas generating cells.

17. Apparatus as defined in claim 14, wherein said cooling means is arranged adjacent said end electrode plate containing said outlet opening.

18. Apparatus as defined in claim 14, and further comprising tubular spacer means (13, 15) between said plates adjacent and communicating with said apertures and said inlet and outlet openings, thereby to define a flow path for electrolyte and generated gas.

19. Apparatus as defined in claim 14, wherein said electrode plates extend beyond said spacer means.

20. Apparatus as defined in claim 19, wherein at least two spaced points on the outer periphery of each of said spacer means coincide with the peripheries of the adjacent electrode plates.

21. Apparatus as defined in claim 20, wherein said electrode plates are rectangular, the outer circumference of each of said spacer means being tangential to at least two adjacent edges of the adjacent electrode plates.

22. Apparatus as defined in claim 14, and further comprising at least one duct extending through said cells for receiving cooling fluid.

23. Apparatus as defined in claim 22, wherein said apertures are arranged in alignment and further comprising a plurality of further spacer means arranged between said plurality of electrode plates, each of said further spacer means containing a channel in alignment with said apertures, thereby to define said duct.

24. Apparatus as defined in claim 14, wherein each of said electrode plates contains an opening arranged within the periphery of said annular spacer means, and further wherein said clamping means comprises a bolt which is adapted to pass through said openings.

25. Apparatus as defined in claim 14 and arranged for the electrolysis of water to generate oxygen and hydrogen, and further comprising
    (h) a plurality of gas-impervious diaphragms (11) arranged in said cells, respectively, spaced from and parallel with a pair of said electrode plates to divide said cells into oxygen generating and hydrogen generating portions, respectively;
    (i) first duct means having an electrolyte inlet opening and an oxygen outlet opening and extending through said cells in communication with said oxygen generating portions, respectively; and
    (j) second duct means having an electrolyte inlet opening and a hydrogen outlet opening and extending through said cells in communication with said oxygen generating portions, respectively.

26. Apparatus as defined in claim 25, wherein each of said gas generating cells further comprises first closed-loop spacer means arranged between one of said cell-defining electrode plates and said diaphragm, and second closed-loop spacer means arranged between the other of said cell-defining electrode plates and said diaphragm.

27. Apparatus as defined in claim 25, and further comprising pressure differential sensor means connected with said oxygen and hydrogen outlets for controlling venting of one gas volume when it exceeds a threshold pressure in excess of the other gas volume.

28. Apparatus as defined in claim 14, and further comprising one-way valve means connected with said inlet opening.

29. Apparatus as defined in claim 14, and further comprising a vessel containing a fluid within which said cells are immersed.

30. Apparatus as defined in claim 29, and further comprising a heat exchanger and means for circulating the fluid from said vessel through said heat exchanger and back to said vessel.

31. Apparatus as defined in claim 29, and further comprising vibrating transducer means mounted on a wall of said vessel.

32. Apparatus as defined in claim 14, and further comprising means for vibrating at least said gas generating cells to promote release of gas from its electrodes.

33. Apparatus as defined in claim 14, and further comprising an electrolyte tank including a series of cooling cells for receiving gas and electrolyte from said outlet opening and for passing the gas and electrolyte into said tank.

34. Apparatus as defined in claim 33, wherein said tank cooling cells comprise a plurality of parallel plates having spacer means between adjacent plates, each of said plates containing an aperture to afford a flow path through said cells for gas an electrolyte.

35. Apparatus as defined in claim 14, wherein said annular spacer means of said cooling cells is formed of electrically conductive material and comprises said electrical short circuit means.

36. An electrolysis apparatus, comprising
    (a) a plurality of spaced parallel electrode plates defining a plurality of stacked cells, said plates each containing an aligned aperture; and
    (b) cooling duct means for transporting cooling fluid through said cells, each cooling duct comprising spacer means arranged between said plates, said spacer means containing a channel communicating with said aligned apertures.

* * * * *